(12) United States Patent
Drory

(10) Patent No.: US 11,270,856 B2
(45) Date of Patent: Mar. 8, 2022

(54) INPUT DEVICE

(71) Applicant: Matthaeus Drory, Eichgraben (AT)

(72) Inventor: Matthaeus Drory, Eichgraben (AT)

( * ) Notice: Subject to any disclaimer, the term of this patent is extended or adjusted under 35 U.S.C. 154(b) by 0 days.

(21) Appl. No.: 17/043,807

(22) PCT Filed: Apr. 17, 2019

(86) PCT No.: PCT/AT2019/060130
§ 371 (c)(1),
(2) Date: Sep. 30, 2020

(87) PCT Pub. No.: WO2019/200421
PCT Pub. Date: Oct. 24, 2019

(65) Prior Publication Data
US 2021/0142967 A1    May 13, 2021

(30) Foreign Application Priority Data
Apr. 18, 2018 (AT) .............................. A 60058/2018

(51) Int. Cl.
*G06F 3/02*     (2006.01)
*H01H 13/84*    (2006.01)

(52) U.S. Cl.
CPC ........... *H01H 13/84* (2013.01); *G06F 3/0216* (2013.01); *H01H 2217/034* (2013.01); *H01H 2217/048* (2013.01)

(58) Field of Classification Search
CPC ............ H01H 13/84; H01H 2217/034; H01H 2217/048; G06F 3/0216; G06F 3/033;
(Continued)

(56) References Cited

U.S. PATENT DOCUMENTS 5,410,333 A * 4/1995 Conway ............. A47B 21/0314
                                                              341/20
6,630,925 B1  10/2003 Ostergard
(Continued)

FOREIGN PATENT DOCUMENTS

AT             15344 U    6/2017
CN         201278134 A    7/2009
(Continued)

OTHER PUBLICATIONS

Thiele, Oliver; Das mach ich mit Links . . . http://miy.de/en/tipy-die-einhand-tastatur/ Mar. 2017.

*Primary Examiner* — Pegeman Karimi
(74) *Attorney, Agent, or Firm* — Andrew Wilford

(57) ABSTRACT

The invention relates to an input device in the form of a single-hand keyboard, comprising a substantially flat housing (1) approximately in the shape of a quadrant of a circle, in which housing a first keyboard circuit board having associated first keys (2) is accommodated, the first keys (2) lying on a first housing side (3) and being arranged along concentric circular arc segments in the manner of a fan. A second keyboard circuit board having associated second keys (4) is accommodated in the housing (1), the second keys lying on the second housing side (5) facing away from the first housing side (3), and the layout of the second keys (4) being mirror-inverted with respect to the layout of the first keys (2). Furthermore, a detection element for determining the current orientation of the input device is provided in the housing (1). The detection element activates only the keyboard circuit board facing upward and deactivates the other keyboard circuit board, depending on the orientation.

8 Claims, 2 Drawing Sheets

(58) Field of Classification Search
CPC ............ G06F 3/02; G06F 3/041; G06F 3/045;
G09G 5/08; G09G 5/00
See application file for complete search history.

(56) References Cited

U.S. PATENT DOCUMENTS

| | | | |
|---|---|---|---|
| 6,765,502 B2 | 7/2004 | Boldy | |
| 7,084,876 B1 | 8/2006 | Kaino | |
| 8,649,164 B1* | 2/2014 | Kwok | G06F 1/1666 |
| | | | 361/679.09 |
| 2004/0027335 A1* | 2/2004 | Lin | G06F 3/0216 |
| | | | 345/168 |
| 2005/0099396 A1* | 5/2005 | Mochizuki | G06F 3/0221 |
| | | | 345/168 |
| 2006/0210340 A1* | 9/2006 | Atzmon | G06F 3/0216 |
| | | | 400/472 |
| 2007/0256913 A1 | 11/2007 | Wee | |
| 2011/0175811 A1* | 7/2011 | Edmister | G06F 3/0216 |
| | | | 345/161 |

FOREIGN PATENT DOCUMENTS

| | | |
|---|---|---|
| EP | 1768354 A | 3/2007 |
| JP | 62152031 A | 7/1987 |
| KR | 20120070162 A | 6/2012 |
| WO | 2017162712 A | 9/2017 |

\* cited by examiner

INPUT DEVICE

CROSS REFERENCE TO RELATED APPLICATIONS

This application is the US-national stage of PCT application PCT/AT2019/060130 filed 17 Apr. 2019 and claiming the priority of Austrian patent application A60058/2018 itself filed 18 Apr. 2018.

TECHNICAL FIELD

The invention relates to an input device in the form of a one-hand keyboard comprising a substantially flat housing shaped generally as a 90° sector carrying a first key array with respective first keys, the first keys being in a fan-shaped array on a first housing side in concentric circularly arcuate rows.

STATE OF THE ART

An increasingly large part of today's working world works with computers. One of the most important input devices in computer work is the keyboard and there are numerous approaches to increasing the ergonomics of keyboards in order to enable fatigue-free work without stress for the user. From a practical point of view, optimal ergonomics are often limited by the fact that the layout of the keyboard should not deviate too much from generally known and largely standardized layouts, and that its manufacturing costs should also be competitive with inexpensive conventional keyboards.

For people with disabilities, in particular who can only for example use one hand, there are practically no inexpensive solutions suitable for the masses that allow simple work on a PC. If anything, only special solutions are known, such as described in US 2001/0021332 [U.S. Pat. No. 6,765,502] where on the one hand the production costs are very high, since complex arrangements of the keys and the circuit board are necessary, and on the other hand require a high level of training of the user, since the key layout deviates completely from the known standard layout.

A simpler solution is, for example, in KR 20120070162 that discloses keys arranged like a fan in a semicircle, the cursor keys being placed near the center point. This keyboard can at least be implemented on a known flat key array and is largely based on standard layouts, but it has the disadvantage that the user's hand has to be turned back and forth by 180° straining the wrist when working for a long time. In addition, the keyboard can only be made very small so that the upper rows of keys can still be reached without the cursor keys being accidentally pressed with the ball of the hand. This makes it difficult to type quickly and fluently.

In AT 15344 a one-hand keyboard is disclosed that, like conventional keyboards, can be manufactured inexpensively with a flat key array. The keys are arranged fan-shaped on concentric circular arcs in a 90° sector. There is a palm rest at the edge of the keyboard, which allows easy access to all keys. Although this keyboard solves the problems mentioned above, it has been found in practice that there is still room for improvement. The keyboard mentioned above does not take into account whether the user is right-handed or left-handed. Since the majority of people are right-handed, most mass-produced articles are also manufactured for them, the arrangement of the keys on a keyboard, for example, in particular the position of control keys, cursor, trackball, etc., then being suboptimal for left-handed people.

In addition to being used for people with disabilities, one-hand keyboards also have advantages in many activities where computer input has to be made while another activity is carried out with the other hand. This concerns, for example, inputs to production machines, inventory activities, calculating, etc. Here, depending on the activity, it may well happen that the user employs the dominant hand for the actual activity and does the computer input with the other hand.

In JP S62152031 there is a two-sided keyboard that has keys on the top and bottom. The two keyboards have a different layout with regard to the character set used, so that people with different language requirements can use the same computer without having to switch the input device. Nothing is mentioned in more detail in the document about the type of switchover.

SUMMARY OF THE INVENTION

The object of the present invention is therefore to improve the above-mentioned ergonomic and easy-to-manufacture one-hand keyboard so that it can be used optimally by the user either for the right or left hand. The manufacturing costs should continue to be kept as low as possible, so that the product can be used widely and inexpensively.

This object is achieved according to the invention in that a second keyboard with respective second keys is provided on the housing, the second keys being on a second housing side facing away from the first housing side, the layout of the second keys being a mirror image of the layout of the first keys, and a detection element is also provided in the housing to determine the current orientation of the input device, the detection element, depending on orientation, only activating the key array directed upward and deactivating the other key array. When it comes to manufacturing costs, the electronic components are no longer the decisive factor. Most of the costs here are for the injection molding tools for the manufacture of the housing and the keys. The provision of a second key array consequently does not increase the manufacturing costs to an excessive extent. The keys are largely identical on both sides, only arranged differently, which is why costs are kept low here too. The housing also does not incur any higher costs than the above-mentioned keyboard according to the prior art, since only one type of housing has to be manufactured. The user can simply place the input device according to the invention in the desired orientation for the left or right hand in front of him and the detection element recognizes which of the two key arrays is pointing upward and activates it while the other is deactivated. Even if several people with different usage preferences work on a device, each user can simply turn the input device over while it is in operation and thus activate the other key array.

According to a further advantageous feature it is provided the apex area of the circularly sector-shaped housing is provided with a projection to which a hand rest that can be attached to the projection can be connected, the projection being symmetrical so that the hand rest is attachable optionally in one of the two possible orientations of the input device. A raised palm rest makes it possible for the user to comfortably place his hand in the top area of the input device when working on the keyboard for a long time and thus to comfortably reach all keys without wrist strain. When changing orientation, the palm rest is simply removed and, after turning the keyboard over, put back on the projection.

It is another advantageous feature that latching projections or complementary recesses are provided on the housing and/or on the hand rest to secure the hand rest in the attached position. In order that the hand rest is held on the housing of the input device so that it is recognizable for the user, it is advantageous if it snaps into place in its attached position on the housing.

As an alternative or in addition to this, it is another advantageous feature that magnetic connecting elements are provided on the housing and/or on the hand rest to secure the hand rest in each of the attached positions. Instead of or in addition to mechanical catches, magnetic catches can also be used.

Connecting elements can be provided between the palm rest and the housing. Magnetic connecting elements have the advantage that they can also be accommodated completely invisibly inside the housing or the palm rest and thus create a smooth outer housing surface that is easy to clean.

According to one possible embodiment, it is provided that the detection element is a position sensor, for example an acceleration sensor or an inclination sensor. These sensors are now used very cheaply and widely, for example in tablets or cell phones.

According to an alternative embodiment, it is provided that the detection element is formed by electrical contact points on the housing, the contact points being positioned symmetrically on both sides of the housing, and with only the contact points from one side of the housing connected to corresponding mating contacts on the handrest when the hand rest is attached, whereby the orientation of the input device is determined by the attachment direction of the palm rest. This variant is particularly inexpensive to implement. Since the palm rest has to be removed and reinserted in any case when the alignment of the input device is changed, the appropriate key array can also be activated by making an electrical contact.

An additional advantageous feature is that a respective key is arranged on the projection of the housing for the hand rest on both sides, with only one of the two keys being actuatable by the hand rest depending on the orientation of the attached hand rest. This additional key can be freely programmed or, for example, can also be used to unlock the keyboard, so that the relevant key array is only activated when the hand is placed on the palm rest.

Finally, it is a further advantageous feature that support projections are provided on both sides of the housing that project past the keys on the respective housing side in the unpressed state. The support projections can, for example, be designed as ridges above and below the key arrays. This ensures that the keys on the downward facing side of the housing, which are currently deactivated, are not pressed during use. Since the respective keyboard circuit board is currently deactivated in this state, pressing has no effect on the function of the input device, but it could give the user an unsafe and unsteady feeling. The support projections, on the other hand, allow the input device to be set up securely and firmly on a level surface.

BRIEF DESCRIPTION OF THE DRAWINGS

The invention will now be described in greater detail on with reference to a single embodiment and with the aid of the accompanying figures. Therein.

WAY (E) FOR CARRYING OUT THE INVENTION

Figure 1:
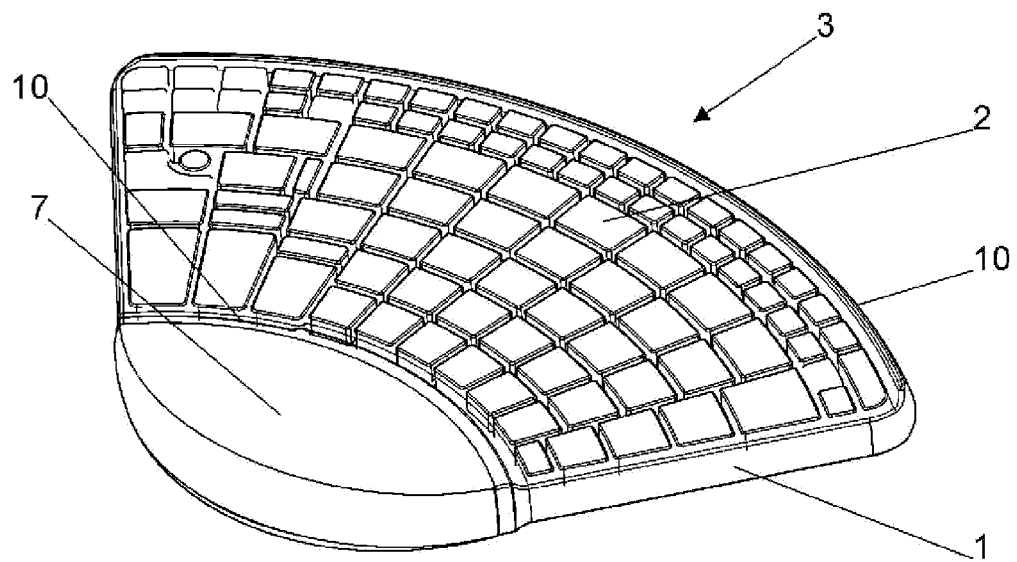
FIG. 1 is a schematic perspective view of a first housing side of an input device according to the invention.

The input device according to the invention shown in FIG. 1 has a housing 1 from which two key arrays face in opposite directions. One of these points upward and is holds the first keys 2 that project through complementary holes on a first side 3 of the housing. A hand rest 7 is provided in the apex area of the 90° sector-shaped housing 1. The hand rest 7 can, for example, be a gel cushion attached to the housing 1.

Figure 2:
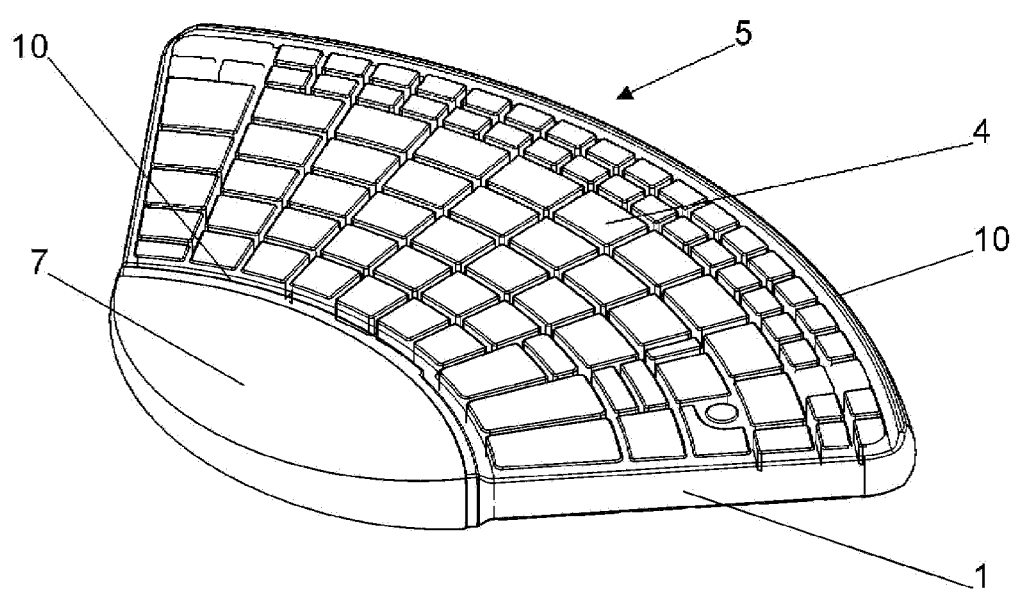
FIG. 2 is a schematic perspective view of the second housing side of the input device of FIG. 1 according to the invention.

Projecting above and below the keys 2 there are support projections 10 in the form of circularly arcuate ridges that are also concentric with one another. In FIG. 2, the input device from FIG. 1 is shown when it is in an opposite orientation. To do this, the hand rest 7 is removed, the input device is turned over and the hand rest 7 is then put back on. In the second orientation, the second side of the housing 5 is now on top. The second keys 4 of the second keyboard array are positioned in a layout that is a mirror image of the layout of the first keys 2. As a result, the input device can be adapted very easily to a right-handed or left-handed user, with every user enjoying the same ergonomic advantages.

Figure 3:
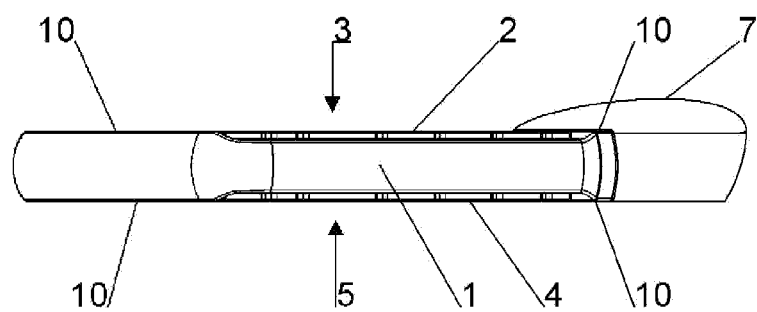
FIG. 3 is a side view of the input device according to the invention from FIG. 1.

FIG. 3 shows the input device from the side, both sides 3 and 5 of the housing [1] and the keys 2, 4 of both key arrays being visible. The support projections 10 that extend slightly beyond the keys 2, 4 and thus serve as rest points for the input device on a base, are also clearly visible.

Figure 4:
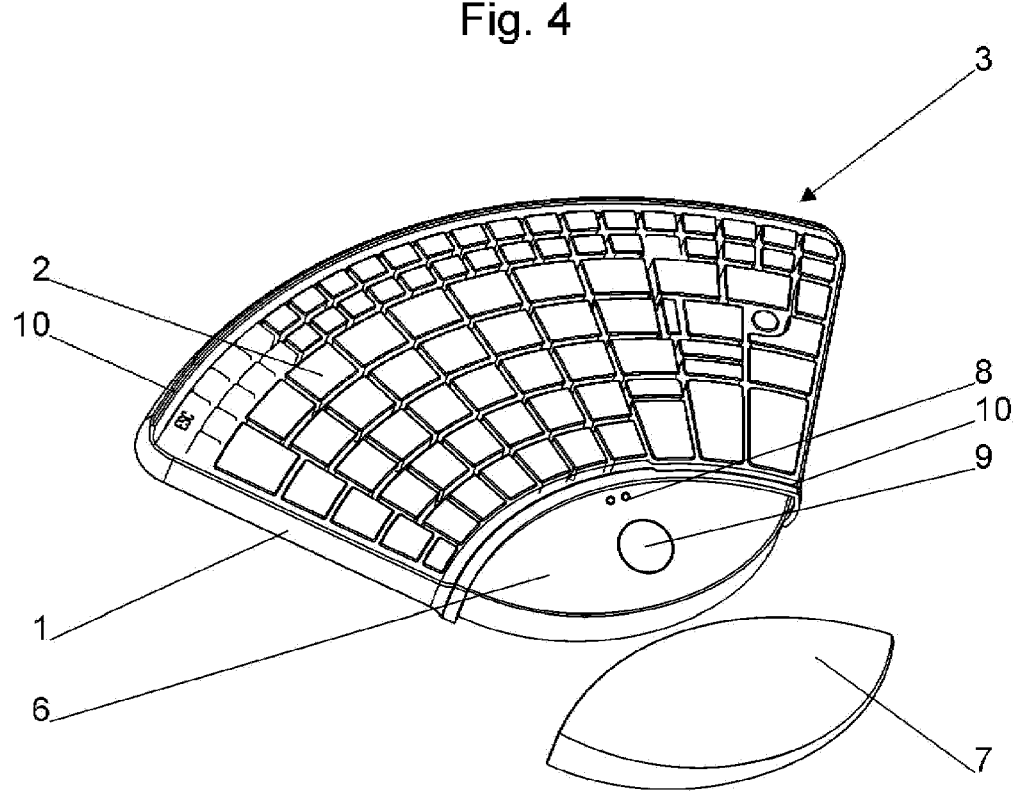
FIG. 4 is an exploded view of the input device according to the invention from FIG. 1 with the hand rest removed.

In FIG. 4 the input device according to the invention is shown with the hand rest 7 removed, showing the projection 6 in the apex area of the housing 1 and onto which the hand rest 7 can be fitted. A button 9 is shown schematically on the projection 6 that can be actuated by pressing on the hand rest 7 when the hand rest 7 is attached. Furthermore, contact points 8 are shown that engage respective contacts on the hand rest 7 when plugged in to establish an electrical connection in this embodiment and thus serve as a detection element for the orienting the input device.

The invention claimed is:

1. A one-hand keyboard comprising:
    an essentially flat housing shaped generally as a 90° sector and having a first side and an opposite second side;
    a fan-shaped first key array of first keys in concentric circularly arcuate rows on the first side,
    a fan-shaped second key array of second keys on the second side of the first housing facing away from the second side, a layout of the second keys being a mirror image of the layout of the first keys; and
    a detection element in the housing for determining a current orientation of the input device, the detection element, depending on the detected orientation, only activating the one of the first and second key arrays pointing upward and deactivating the other key array.

2. The one-hand keyboard according to claim 1, further comprising:
    a projection provided in an apex area of the sector-shaped housing; and
    a hand rest connectable to the projection, the projection being symmetrical so that the hand rest can optionally be attached in one of the two possible attached positions of the one-hand keyboard.

3. The one-hand keyboard according to claim 2, further comprising:

latching projections or complementary recesses on the housing and on the hand rest to secure the hand rest in each of the attached positions.

4. The one-hand keyboard according to claim 2, further comprising:
magnetic connecting elements on the housing and on the hand rest to secure the hand rest in each of the attached positions.

5. The one-hand keyboard according to claim 2, wherein the detection element is formed by electrical contact points arranged on the housing the contact points being arranged symmetrically on both sides of the housing, and wherein each time the hand rest is inserted, only the contact points on one side of the housing are connected to corresponding mating contacts on the hand rest, whereby the orientation of the one-hand keyboard is determined by the direction in which the hand rest is attached.

6. The one-hand keyboard according to claim 2, further comprising:
respective buttons on both sides of the projection of the housing positioned such that, depending on the orientation of the attached hand rest only one of the two buttons be actuated by the hand rest.

7. The one-hand keyboard according to claim 1, wherein the detection element is an acceleration sensor or an inclination sensor.

8. The one-hand keyboard according to claim 1, further comprising:
support projections arranged on both sides of the housing that are taller than the keys, on the respective side in the unpressed state.

\* \* \* \* \*